Patented Aug. 1, 1933

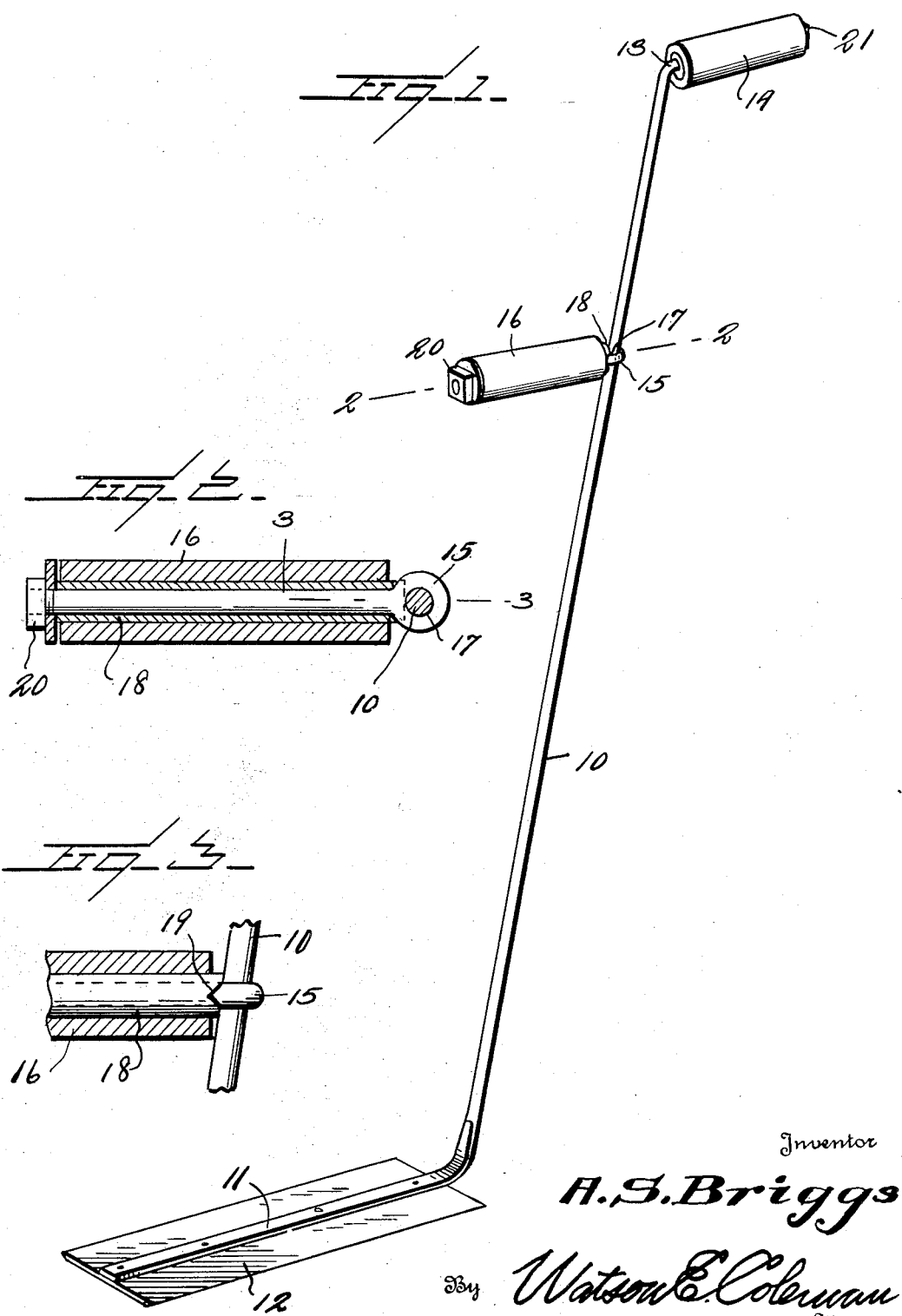

1,920,169

UNITED STATES PATENT OFFICE 1,920,169

WEED AND GRASS CUTTER

Alva S. Briggs, Adams, Tenn., assignor of one-fourth to Robert Clarence Riggan and one-fourth to Robert Fulton Ridings, Adams, Tenn.

Application July 21, 1932. Serial No. 623,872

3 Claims. (Cl. 30—9.)

This invention relates to weed or grass cutters of that character wherein a shank is provided having a cutting blade at its lower end and having a handle at its upper end whereby the shank may be swung to cut off weeds and to cut grass.

The general object of the present invention is to provide a device of this character which is very simple, which is easily manipulated and which will do the work stated particularly effectively.

A further object is to provide a device of this character which has two handles one to be held stationary in the hand while the other is operated by the other hand to swing the blade transversely of its length, and a further object in this connection is to make the second handle on the shank adjustable along the shank.

My invention is illustrated in the accompanying drawing, wherein:—

Figure 1 is a perspective of the grass cutter constructed in accordance with my invention;

Figure 2 is a detailed sectional view on the line 2—2 of Figure 1;

Figure 3 is a detailed sectional view on the line 3—3 of Figure 2.

Referring to the drawing, 10 designates the shank of my implement which may have any desired or suitable length, the lower end of this shank being bent at an angle to the body of the shank as at 11 and having a double edged blade 12 riveted, welded or otherwise attached thereto. This blade may have any desired length and any desired width and the shank is disposed at an obtuse angle to the blade. The upper end of the shank is angularly bent as at 13 and carries upon it the rotatably supported handle 14. This handle 14 is disposed at an obtuse angle to the shank and approximately parallel to the blade 12. Mounted on the shank 10 for adjustment toward or from the handle 14 is a second handle shank 15 which carries upon it a rotatable handle 16. This extends forward or in a direction reverse to the handle 14 and is approximately parallel with this handle.

As illustrated, the handle shank 15 has an aperture 17 through it through which the shank passes. Surrounding the handle shank is a sleeve 18 of metal, the end of this sleeve being notched as at 19 so that the notches may partially embrace the shank 10. The extremity of the handle shank 15 is screw-threaded for engagement by a nut 20 and washer so that when this nut is screwed up, the sleeve 18 will be forced into engagement with and bind on the shank 10, the tubular handle 18 being loose on the handle shank. The tubular handle 14 is also held from detachment on the angular shank 13 by means of a nut 21. This device may have any desired length but in practice, the shank 10 will have a length of approximately 44 inches, the blade is three inches wide and thirteen inches long. The handle 16 is disposed at any convenient position below the handle 14.

In the use of this device, the handle 14 is grasped by the right hand and the handle 16 by the left hand. The blade may then be swung to cut the grass or weeds either by swinging the left hand back and forth or by swinging the right hand back and forth. The blade may also be manipulated by simply holding in the right hand and swinging the blade freely for relatively light grass or isolated weeds. By means of this device, it is possible to cut such sprouts as persimmon and sassafras sprouts which grow up in fields as volunteers and which are too large to be cut by the ordinary mowing machine. It is also applicable to cutting weeds, grass, briers and bushes. The blade may be bolted to the angular portion 11, be welded or riveted thereto.

As before stated, the upper handle may be held stationary with a hand pressing it against the hip and the middle or lower handle worked with the hand or both handles may be oscillated with the hands pulling in opposite directions. In either case, the blade is swung to cut the growth. The implement may be operated by either a left or right handed operator. This device conserves the operator's energy by its special design and inasmuch as the long stroke gives the power of oscillating the implement. The material cut does not hang on the blade. The handles rotate and do not blister the hands and the blade does not turn out of position on the stroke but is always under complete control. The stroke is made naturally two or three feet from the operator which does not endanger his person. The blade rides the grass, weeds or bushes upon the backward stroke, giving no load for the operator to carry and the operator can stand erect while cutting with this tool. The lower end of the tool is relatively light so that there is no tendency to overbalance the operator.

I claim:—

1. A grass and weed cutter of the character described, comprising a shank, a handle at the upper end of the shank projecting therefrom at an obtuse angle thereto, a blade at the lower end of the shank and projecting therefrom parallel to the handle but at an obtuse angle to the shank, the blade having opposed cutting edges, and a second handle disposed along the shank between the first-named handle and the blade, the second named handle having a central handle shank having an eye through which the first named shank passes, a sleeve loosely mounted upon the handle shank for movement toward and from the first named shank and having notches at its inner end, a nut engaging the handle shank and holding the sleeve with its notch end in engagement with the first named shank, and a tubular handle rotatably mounted upon the sleeve.

2. A grass and weed cutter of the character described comprising a longitudinally extending shank angularly bent at one end and at the opposite end angularly bent in an opposite direction, a blade attached to the last named end, a rotatable handle mounted upon the first-named angular end, the handle being parallel to the blade, and a rotatable handle mounted upon the shank and extending approximately parallel to the first-named handle but extending in a reverse direction.

3. A grass and weed cutter of the character described comprising a longitudinally extending shank angularly bent at one end and at the opposite end angularly bent in one direction, a blade attached to the last named end, a rotatable handle mounted upon the first named angular end, the handle being approximately parallel to the blade, and a rotatable handle mounted upon the shank and extending approximately parallel to the first named handle and being adjustable along the shank and rotatively around the shank.

ALVA S. BRIGGS.